Patented Sept. 6, 1938

2,129,598

UNITED STATES PATENT OFFICE 2,129,598

PROPAGATION OF PLANTS

Percy W. Zimmerman and Albert E. Hitchcock, Yonkers, N. Y., assignors to Boyce Thompson Institute for Plant Research, Inc., Yonkers, N. Y., a corporation of New York No Drawing. Application April 1, 1936, Serial No. 72,058

8 Claims. (Cl. 47—58)

This invention relates to the propagation of plants from cuttings, and has for its object the provision of an improved method for inducing root-growth on such cuttings.

It has heretofore been recognized that certain gases (e. g. ethylene) induce definite types of formative responses on plants, such as stimulation or retardation of the growth of certain tissues, and the initiation of cell division which results in various kinds of proliferations or in the formation of roots. As the result of an exhaustive investigation of the effects of various types of growth substances on plants, we have discovered that certain organic compounds exercise a pronounced stimulating effect on root-growth, and are highly valuable in promoting and inducing root-growth on plant slips or cuttings.

In this specification and in the appended claims, the word "cutting" and the expression "cuttings and the like" are used generically to designate any part of a plant, including buds, scions and slips, used for purposes of propagation, and the invention advantageously may be employed to promote plant propagation from any such plant part by inducing active callus formation, root-growth, and similar plant physiological responses.

The organic compounds which we find useful for inducing root-growth may be generally identified as substances of the group consisting of a substituted acetic acid, its esters, nitriles and salts, the substituent being selected from the group consisting of indole radicals and aromatic hydrocarbon radicals containing up to three condensed nuclei, and as indole substitution products of a compound having a lower fatty acid structure as its nucleus. These organic compounds, which are referred to hereinafter as the growth substances of the invention, are mono-substitution products, that is, the indole or aromatic hydrocarbon substituent is substituted for only one of the hydrogen atoms of the terminal carbon atom furthest from the carboxyl group of the acid.

Based on the foregoing discovery, our present invention involves the improvement in propagating plants from cuttings which comprises the step of inducing root-growth by subjecting the cutting to the action of a growth substance of the invention, as above identified. Only a minute amount of the growth substance of the invention is necessary to induce vigorous root-growth, and high concentrations are injurious rather than beneficial. Among the growth substances which we have found of special advantage in the practice of the invention are indoleacetic acid and its methyl ester, indolebutyric acid and its methyl ester, indolepropionic acid and its methyl ester, naphthaleneacetic acid (both alpha and beta) and its methyl and ethyl esters, and phenylacetic acid and its methyl ester. In these compounds, the aliphatic acid is a lower fatty acid. In general, substituted acetic acid in which a hydrocarbon ring has been substituted for one of the hydrogen atoms of the terminal carbon atom furthest from the carboxyl group and indole-substituted lower fatty acids in which, similarly, the indole ring is substituted for a hydrogen atom in the terminal carbon atom furthest from the carboxyl group (and esters, salts and nitriles of such acids) have been found useful for the practice of the invention. Satisfactory results have, for example, been obtained with indolevaleric acid, acenaphthyl-(5)-acetic acid, phenylacetic acid, fluoreneacetic acid, anthraceneacetic acid, and esters, salts and nitriles of such acids such, for example, as alpha-naphthylacetonitrile.

Treatment of the more succulent types of plants, such as the tomato, African marigold, tobacco etc. with the growth substances of the invention (i. e. organic compounds of the aforementioned types) have shown that roots may be induced to grow from any portion of the stem, and even from the leaves of many species. The growth substance may be mixed with lanolin, olive oil, paraffin oil, maize oil, castor oil, "Amalie" oil (a commercial mineral oil) and the like and a thin film of the mixture applied by rubbing with a glass rod on the epidermis of the region to be treated. The usual concentrations found most effective are from about 0.01 to 2% of the growth substance on the weight of lanolin or the like. Lanolin (and similar) preparations of the growth substance may be applied directly to the cutting, or they may be placed on shoots which remain attached to the parent plant during the period of treatment and are then removed and made into cuttings that are handled at this stage the same as is normally done in commercial practice.

When applied to the stems, the growth substances of the invention definitely cause local initiation of roots on growing plants of tomato, sunflower, marigold, artichoke, buckwheat, dahlia, and tobacco. Alpha-naphthaleneacetic acid and indolebutyric acid are especially effective for initiating roots on both stems and leaves. If the plants are kept in a glass case after treatment, the new roots force their way through the epidermis and out into the humid atmosphere. The time required for roots to make their appearance varies with the growth substance used, the concentration, the species of plants, and the exact place on the plant where the material is applied. The following table indicates the comparative effectiveness of several growth compounds causing rooting, swelling, and negative (away from side where substance was applied) bending of tomato stems. Positive (toward side where substance is applied) bending occurs when the concentration of the substance is high enough to injure the tissue or retard the normal rate of growth:

*Effective concentration range of five growth substances for tomato, expressed in per cent in lanolin*

| Chemical substances | Causing negative bending of stem or epinasty of leaves | Inducing adventitious roots |
|---|---|---|
| a-Naphthaleneacetic acid | 0.0100–2.0 | 0.1–2.0 |
| Indolebutyric acid | 0.0100–2.0 | 0.1–2.0 |
| Indoleacetic acid | 0.0003–2.0 | 0.4–2.0 |
| Indolepropionic acid | 0.0250–2.0 | 1.0–2.0 |
| Phenylacetic acid | 0.0250–3.0 | 1.0–3.0 |
| Fluoreneacetic acid | 0.0500–3.0 | 1.0–3.0 |

In general, it might be stated that the most effective concentration for root initiation falls just below that causing positive bending of the stem or at the point where there is slight retardation of growth. When the concentration is high enough to cause evident injury, roots appear on the opposite side, or adjoining the place on the stem where the substance is applied. This result indicates that as the growth substance diffuses away from the point of toxic concentration, a range is reached which is effective for inducing roots. Under favorable conditions, 5 to 10 mg. of indolebutyric acid or a-naphthaleneacetic acid per gram of lanolin causes roots to be induced and appear through the epidermis on tomato in 6 days, marigold in 5 days, tobacco in 8 days, and artichoke in 6 days. Twenty milligrams of phenylacetic acid per gram of lanolin cause similar responses. One milligram of indolebutyric acid or naphthaleneacetic acid per gram of lanolin is effective but usually requires two days more to induce roots.

In commercial practice, treatment of the cutting or parent plant with a water solution of the growth substance is generally more satisfactory and applicable than treatment with lanolin (and similar) preparations. Thus, the growth substance may be dissolved in water (in which it is only sparingly soluble), and the basal end of the plant cutting placed in the solution. Immersion of the cutting in such a solution for from several hours to several days induces subsequent growth of excellent root systems. The concentration of the growth substance in the aqueous solution is relatively minute, say a few milligrams per 100 cc. of water. For example, a solution made up of 10 mg. of indoleacetic acid per 100 cc. of water gives satisfactory results. Similarly, water solutions of naphthaleneacetic acid of 0.00005% and less give good results.

In practicing the invention with water solutions of the growth substances, the plant cutting is placed in the solution for a period of time ranging from a few hours to several days. The cutting, after treatment in the solution, may be planted in a mixture of half sand and half peat moss. The effectiveness of the treatment is indicated in many ways, such as the increased percentage of rooted cuttings, increase in size of the root systems, earlier appearance of roots, greater total number of roots and the emergence of roots from stem tissue above the base of the cutting as well as at the base.

Cuttings of the American holly (*Ilex opaca*) taken during the last week of December (vicinity of New York city) and placed in solutions of indoleacetic acid or napthaleneacetic acid (10 mg. per 100 cc.) for periods ranging from 6 hours to four days produced excellent root systems five weeks after treatment and planting in a peat moss and sand mixture. These results are of special significance since December and January represent one of the poorest times of the year to root cuttings of the American holly. A similar favorable response to treatment with water solutions of the same root-forming growth substances was obtained for *Ilex crenata* at the end of three to four weeks, and for Taxus at the end of eight to ten weeks.

We claim:

1. The improvement in propagating plants from cuttings and the like, which comprises the step of inducing root-growth by immersing the basal end of the cutting in an aqueous solution of a substance of the group consisting of a substituted acetic acid, its esters, nitriles and salts, the substituent being selected from the group consisting of indole radicals and aromatic hydrocarbon radicals containing up to three condensed nuclei.

2. The improvement in propagating plants from cuttings and the like, which comprises the step of inducing root-growth by immersing the basal end of the cutting in an aqueous solution of an indole substitution product of a compound having a lower fatty acid structure as its nucleus.

3. The improvement in propagating plants from cuttings and the like, which comprises the step of inducing root-growth by immersing the basal end of the cutting in an aqueous solution of a compound of the group consisting of indoleacetic acid, salts of indoleacetic acid and esters of indoleacetic acid.

4. The improvement in propagating plants from cuttings and the like, which comprises the step of inducing root-growth by immersing the basal end of the cutting in an aqueous solution of indoleacetic acid.

5. The improvement in propagating plants from cuttings and the like, which comprises the step of inducing root-growth by immersing the basal end of the cutting in an aqueous solution of a salt of indoleacetic acid.

6. The improvement in propagating plants from cuttings and the like, which comprises the step of inducing root-growth by immersing the basal end of the cutting in an aqueous solution of an ester of indoleacetic acid.

7. The improvement in propagating plants from cuttings and the like, which comprises making up a preparation comprising, in a suitable vehicle, a small quantity of a substance of the group consisting of a substituted acetic acid, its esters, nitriles and salts, the substituent being selected from the group consisting of indole radicals and aromatic hydrocarbon radicals containing up to three condensed nuclei, and inducing root-growth on a cutting by applying said preparation directly to the epidermis of the region at which root-growth is desired on the cutting.

8. The improvement in propagating plants from cuttings and the like, which comprises making up a preparation comprising a small quantity of an indole substitution product of a compound having a lower fatty acid structure as its nucleus in a suitable vehicle, and inducing root-growth on a cutting by applying said preparation directly to the epidermis of the region at which root-growth is desired on the cutting.

PERCY W. ZIMMERMAN.
ALBERT E. HITCHCOCK.